United States Patent [19]

Roberts

[11] 4,043,862
[45] Aug. 23, 1977

[54] FIRE RESISTANT VERMICULITE COMPOSITION BOARD AND METHOD OF MANUFACTURE

[75] Inventor: James R. Roberts, Sao Paulo, Brazil

[73] Assignee: Eucatex S. A. Industria E Gomercio, Sao Paulo, Brazil

[21] Appl. No.: 597,451

[22] Filed: July 21, 1975

[51] Int. Cl.² .............. D21H 3/22; D21H 3/28; D21H 3/66; D21J 1/08

[52] U.S. Cl. ............... 162/135; 162/159; 162/176; 162/181 B; 162/181 C; 162/181 D; 162/187; 162/207; 428/334; 428/454; 428/920

[58] Field of Search .......... 162/181 C, 181 R, 181 D, 162/176, 149, 145, 135, 159, 183, 181 B, 187, 207, 217; 428/453, 454, 920, 332, 334

[56] References Cited

U.S. PATENT DOCUMENTS

| | | | |
|---|---|---|---|
| 1,905,541 | 4/1933 | Wiener et al. | 162/159 |
| 2,108,761 | 2/1938 | Becker | 162/181 C |
| 3,001,907 | 9/1961 | Bergstrom | 162/181 D X |
| 3,095,347 | 6/1963 | Becker | 162/181 R |
| 3,244,632 | 4/1966 | Schulz et al. | 162/149 |
| 3,379,609 | 4/1968 | Roberts | 162/181 R |
| 3,682,667 | 8/1972 | Roberts et al. | 162/145 |

*Primary Examiner*—Richard V. Fisher
*Attorney, Agent, or Firm*—Eugene D. Farley

[57] ABSTRACT

A fire resistant vermiculite composition board comprises, in percent by weight, from 40 to 90% heat expanded vermiculite particles; from 5 to 20% ceramic clay particles; from 10 to 30% hydrated cellulosic gel having a TAPPI drainage time of at least 900 seconds; from 1 to 20% defiberized wood; and from 1 to 20% starch. The vermiculite is in an incompletely expanded condition of a degree predetermined to permit its further expansion upon subsequent exposure to heat. This results in a corresponding expansion of the composition board of which it is a component when the board is exposed to fire, preventing the formation of cracks and insuring continued fire protecting coverage of the area across which the board is applied.

19 Claims, No Drawings

FIRE RESISTANT VERMICULITE COMPOSITION BOARD AND METHOD OF MANUFACTURE

BACKGROUND OF THE INVENTION

This invention pertains to fire resistant composition boards of the class relying upon the inclusion of a noncombustible mineral substance for its fire resisting properties. It pertains particularly to fire resistant composition boards containing vermiculite.

In a widely practiced commercial process for making composition board, a fibrous cellulosic pulp slurry is run onto a Fourdrinier wire screen and vacuum formed into a wet sheet. The sheet is roller pressed to the desired thickness and kiln dried.

Fire resistant composition board is made similarly, employing a substantial proportion of a mineral substance in the slurry. Mineral substances thus employed include gypsum, perlite, mineral fiber fiberglass and vermiculite.

Gypsum board is widely used, but is heavy and lacks structural strength.

Perlite board shrinks and cracks when exposed to fire. This creates openings which permit transmission and spreading of the fire.

Mineral fiber board also shrinks materially when heated.

Fiberglass board sinters and melts down when exposed to fire, with the same adverse result.

Vermiculite board, as known to the prior art, has inherent disadvantages of a character to be developed in the ensuing discussion.

Vermiculite is a gold-colored mineral substance of widespread occurrence which is available at competitive cost. Its formula is as follows:

$$3\ MgO(FeAl)_2O_3, 3SiO_2$$

Vermiculite as quarried has a certain content of included water. When heated, the water is converted to steam which, as it is released, expands the vermiculite. This transforms the vermiculite to an expanded product of relatively low density. The expanded product still retains, of course, the inherent noncombustible qualities of the parent mineral.

Heat-expanded vermiculite is readily available commercially. It is manufactured throughout the world by crushing vermiculite ore, screening the crushed product to specific particle sizes, and expanding the classified material by flash heating it in a furnace at about 1800° F. The expanded product is screened again, distributed, and applied to its many commercial uses.

In many respects the expanded vermiculite of commerce is well suited for inclusion in fire resistant composition board and like products. It is light in weight, has good properties of fire resistance, can be made into board products using conventional equipment, enhances the appearance of the board, and is available in large quantities at competitive cost.

However, expanded vermiculite in particle form imparts poor drainage qualities to aqueous slurries in which it is included with the result that the slurries form into sheets slowly when run onto the Fourdrinier wire. Also, the finer vermiculite particles, as well as the other finely divided solid components of the slurry, tend not to be retained in the sheet, but to run off with the drainings. This causes a loss of vermiculite and the other solid components with resultant problems of waste disposal.

I now have discovered that the first named of the foregoing problems, namely the poor drainage properties of board-making slurries containing vermiculite, may be overcome by the inclusion in the slurries of a proportion of a particular high-freeness defiberized wood additive. I also have discovered that the second of the problems noted above, namely the failure of the vermiculite to be retained in the sheet on the forming wire, may be overcome by including in the board-making furnish a proportion of hydrated cellulosic gel.

Still further, I have discovered that if the vermiculite is employed in partially or incompletely expanded form it overcomes one of the primary problems attendant upon the use of mineral-containing fire resistant composition boards: their tendency to transmit a fire because of sintering, collapsing, or cracking of the boards when exposed to high temperatures. In the practice of the present invention, advantage is taken of the inherent property of incompletely expanded vermiculite to expand further when heated. This expansion occurs between 1000° and 1800° F., while the heat developed by a fire, and in particular the temperature stipulated in Underwriters' Fire Tests for fire resistant composition board, is of the order of 2200° F.

Accordingly, when incompletely expanded vermiculite is used in the manufacture of a fire resistant composition board, and the board thereafter is exposed to fire, the vermiculite expands further. This causes the board to thrust outwardly in its own plane against adjacent panels, or against frames such as fire door frames in which it is contained. This exerts a sealing pressure and for a substantial time inhibits or prevents the formation of cracks and voids which would transmit the fire.

Another difficulty, which is shared by vermiculite with other minerals employed in the manufacture of fire resistant composition board, is that caused by the combustion of the starch or other organic binders conventionally employed with the mineral substances in the fabrication of the board. In a fire, the board collapses upon burning of the organic binder.

I also have discovered that by the inclusion in a vermiculite board-making slurry of a proportion of a ceramic clay having a sintering temperature below the temperature of burning organic materials, there is provided a backup binder which in a fire situation is available to insure the dimensional stability and integrity of the board after the organic binders have been consumed. Thus, if the clay sinters at about 1200° F. and the temperature developed by a conflagration is about 2200° F., the sintered clay on the board surface will serve as a binder which is developed before the organic binders burn away entirely. thereby holding the board together.

Yet another problem with vermiculite fireproof composition board, which is shared also by boards containing fire resistant minerals of other classes, resides in the fact that when exposed to fire the cellulose, starch and other organic constituents of the board are subjected to high temperatures at which they decompose into combustible gases. Upon escaping, these gases are ignited and help to spread the fire.

I have discovered further thay by coating at least one face of the fire resistant vermiculite composition board of my invention with a substantially continuous and impervious layer of sodium silicate, the layer thus applied serves as a seal which for an appreciable time seals off the surface of the board, preventing the escape into the fire environment of combustible gaseous degradation products of the organic components of the board and thus preventing their contribution of the spreading of the fire.

BRIEF DESCRIPTION OF THE INVENTION

The fire resistant vermiculite composition board of my invention contains, in percent by weight on a dry solids basis, from 40 to 90% heat-expanded vermiculite particles. Where it is desired to take advantage of its post-board-formation expansion capability, the vermiculite is employed in the form in which it is expanded to from 40 to 98% of its capacity for thermal expansion.

The composition board also contains from 5 to 20% of particles of ceramic clay having a sintering temperature below the temperature developed by the combustion of wood and other organic materials. A sintering temperature of not over 1200° F. is preferred.

As a binder, as a dispersion agent, and as a retention agent for retaining the vermiculite fines and other small particles in the felted sheet on the forming wire, there is included in the board from 10 to 30% of hydrated cellulose gel.

To facilitate rapid drainage of the slurry from which the board is made on the vacuum forming screen, there is included in the slurry from 1 to 20% of wood in fibrous form.

Also, from 1 to 20% of cornstarch or tapioca starch is included as a binder to supplement the hydrate cellulosic gel in bindng together the component particles of the board.

Additionally, where it is desired to enhance the fire resistant qualities of the board, at least one of its surfaces is coated with a coating of sodium silicate from 0.001 inch to 0.010 inch thick. This seals the board surface and in the event of a fire delays the escape of combustible materials formed by the thermal degradation of the organic consituents of the board. It also slows heat pentration into the board due to the presence of a gas-impervious coating.

The fire resistant composition boards of my invention are manufactured by flash heating screened and classified vermiculite ore to expand it to the predetermined degree. The expanded product is screened again, after which it is made into an aqueous slurry with the other solid constituents which are to be incorporated in the board. The slurry is run onto a conventional Fourdrinier wire or other suitable vacuum forming apparatus, and the resulting sheet roller-pressed to thickness. The wet lap then is cut into boards and dried. Thereafter, one or both face surfaces are coated with aqueous sodium silicate by roll coating or other suitable technique to form the finished fire resistant vermiculite composition board.

DESCRIPTION OF SPECIFIC EMBODIMENTS

The fire resistant vermiculite composition board of the invention has the following general composition and is illustrated by the following specific formulations wherein parts are given in percent by weight, dry solids basis:

| | General Composition (%) | Specific Formulations (%) | |
|---|---|---|---|
| | | 1 | 2 |
| Heat Expanded Vermiculite Particles | 40-90 | 56 | 67 |
| Ceramic Clay Particles | 5-20 | 10 | 10 |
| Hydrated Cellulosic Gel | 10-30 | 20 | 10 |
| Starch Binder | 1-20 | 4 | 3 |
| Defiberized Wood | 1-20 | 10 | 10 |

The expanded vermiculite which is the key component of the fire resistant composition board of my invention may be derived from any of its usual commercial sources. As noted, it has when mined an inherent moisture content which imparts to it the property of expansion upon heating. The expanded product is comparatively light in weight, fire resistant, and does not sinter nor degrade chemically when exposed to fire. In addition, it is compatible with the other constituents of the board-making furnish and as an added advantage imparts an attractive golden sparkle to the boards of which it is a component.

The raw vermiculite is converted to the expanded product by reducing it to pieces of classified size suitable for handling, and passing it through a furnace in which it is flash heated for a few seconds at a temperature of the order of 1800° F. The expanded product then is screened to the desired size, which for the present purpose should be between U.S. Sieve Series mesh sizes 6 mesh to 200 mesh. If desired, the total screened product may be employed.

As noted, it is a feature of the invention that for use as a component of the hereindescribed fire resistant composition board, the vermiculite is only partially expanded. When incorporated into the board in a partially expanded condition, and when the board is exposed to high temperatures during a fire at a subsequent time, the latent capacity of the partially expanded vermiculite for furthr heat expansion causes it to expand further, thereby expanding also the board in which it is contained.

This exerts a thrusting action outwardly so that in contradistinction to the tendency of other mineral boards to crack or form voids when exposed to fire, the presently described composition board not only tends to remain intact, but also presses outwardly laterally against adjacent boards, or against frames in which it is contained, sealing off the area, preventing the occurrence of cracks or opening, and thus assisting materially in containing the fire.

The foregoing desired result is achieved when there is employed in the composition board a vermiculite product which is expanded to a degree such that it has reached from 40 to 98%, preferably from 75 to 98%, of its capacity for thermal expansion. In a typical case, its apparent specific gravity is thereby reduced from an original value of 1.0 or 62.4 pounds per cubic foot, to a value of 0.16, or 10 pounds per cubic foot.

The amount of partially expanded vermiculite employed in the hereindescribed composition boards is determined by such factors as the properties desired in the board, and the identity and properties of the other board constituents. In general, however, from 40 to 90% by weight, preferably from 50 to 70% by weight, dry solids basis, of the partially expanded vermiculite is used. At least 40% is required to develop the desired fire resistant qualities. However, in order to form the vermiculite particles into a board, at least 10% of binders and supplemental materials should be used with the vermiculite.

The clay, which is another key component of the hereindescribed composition board, serves dual functions: First, it is per se a valuable fire retardant and accordingly contributes materially to the fire resistance of the board product. Second, it serves as a backup or secondary binder for the vermiculite particles.

This is for the reason that clays are available which sinter at temperatures below those developed during a fire to which the board is exposed. Accordingly, in the event that any organic binders employed in the board are consumed by the fire, the clay sinters at the temperatures at which the organic binders are consumed and in its sintered condition serves to bind the vermiculite particles together, thereby preserving the structural integrity of the board and increasing its useful life under fire conditions.

To this end, there are selected for inclusion in the presently described composition boards clays known to the trade as ceramic clays. These have the common property of sintering when exposed to elevated temperatures. To be suitable, their sintering temperatures should be below the temperature developed by combustion of wood or other organic materials, preferably below about 2,000° F. Their particle size should be not over 50 mesh, U.S. Sieve Series.

The clays suitable for use in the composition boards of the invention comprise broadly the hydrous silicates of alumina of widespread occurrence. One such which is commercially available comprises a hydrous silicate of alumina containing 57% silica, 27.9% alumina and 9.8% combined water. Another suitable clay product comprises the commercially available hydrous silicate of alumina containing 63% silica, 26% alumina and 8.4% combined water.

These and other clays are used in the composition boards of the invention in finely divided form and in the amount of from 5-20% by weight, dry board basis.

A third important constituent of the fire resistant composition board of my invention is hydrated cellulosic gel used in the amount of 10 to 30% by weight, based on the dry weight of the board product.

Like the clay, the gel serves plural purposes: first, that of a binder for the vermiculite particles; second, that of a dispersion aid; and third, that of a fines retention agent.

The function of the gel as a dispersion aid is of particular importance. In this application, it disperses into individual fibers any wood fiber clumps which may be contained in the boardmaking slurry. It also thickens the slurry so that as it is run onto the wire at a consistency of about 5% there is little tendency for the vermiculite to float, or of the clay to sink. Still further, it is responsible for the formation of a very stable slurry which is converted to a finished board product of completely homogeneous cross section.

The function of the gel as a retention agent also is of particular importance. During vacuum forming of the board from a pulp slurry run onto a screen, the finely divided particles of vermiculite, clay, and binder tend to be extracted from the formed sheet by the run-off water. As a retention agent, the gel serves the valuable function of retaining these fines in the sheet, thereby conserving raw materials, improving the properties of the board, and minimizing a waste disposal problem.

The hydrated cellulosic gels suitable for the intended purpose are products in which water of hydration is added to cellulose by the substantially complete beating or refining of cellulose in aqueous medium. The cellulose thereby is converted from a fluffy, fibrous condition into a gelatinous condition, the degree of conversion being dependent upon such variables as the duration of the refining, the nature of the refining equipment, the presence or absence of extraneous chemicals, etc. Conventionally, the conversion is effectuated by mechanically treating cellulose pulp in aqueous medium in disc type or conical refiners such as the Bauer or Jordan.

The cellulose pulp may be derived from any one of several sources, such as the bleached or unbleached wood or bagasse pulps manufactured by the conventional sulphate or sulphite processes. If bagasse is employed as the ultimate raw material, it preferably is depithed before being pulped. The pulps are available on the large commercial scale in the form of dried pulp sheets.

In the manufacture of the hereindescribed gel products, the cellulose pulp is hydrated exhaustively to a degree which is far beyond the degree of hydration of the refined cellulose employed, for example, in the manufacture of glassines paper. This is accomplished by breaking down the cellulose pulp sheets to their component individual fibers or fiber clumps, preferably by adding the dry sheets and water to a conventional hydrapulper, and hydrapulping to a stock consistency of from 4-7%, preferably as close to 7% as possible. This requires about 30 minutes.

The resulting pulp then is pumped to a storage tank and fed is controlled flow to a disc type or conical type primary refiner. There preferably are three such refiners arranged in series with a flow restricting valve downstream from the last refiner to insure an adequate refiner dwell time.

The resulting partially refined and hydrate pulp is passed into a second storage tank which supplies a secondary refiner of the same general class as the primary refiner, but which is effective to complete the hydration of the cellulose pulp. This supplemental and exhaustive refining greatly improves the qualities of the pulp as a binder, dispersing agent, and retention agent when used in the manufacture of the hereindescribed fire resistant composition boards.

In particular, it makes of the gel an "irreversible" binder. This means that a composition board made with the hereindescribed highly refined gel binder can be subjected to the action of boiling water for several hours, with no softening or relaxing of the adhesive bond present between the bonded fibers and particles of clay, perlite and vermiculite. If the board is dried after having been subjected to such a boil test, it is just as strong as it was before boiling. This is the same characteristic exhibited by phenolic resins when they are used as binders.

The degree of refining or hydration of the cellulose pulp may be measured in several ways to verify that the refining procedure has been carried out to a degree sufficient to produce a pulp having properties suitable for the present purposes.

One such test method comprises TAPPI test No. T221-05-63. This measures the drain time of the refined pulps when they are run onto a screen and produces a 1.2 gram, 6¼ inch hand sheet. A pulp which is satisfactory for present purposes will have a drain time of at least 900 seconds, preferably from 900 to 1800 seconds, when subjected to this test.

A second method of checking the suitability of the gel product is to determine the shrinkage upon drying of the hand sheet produced by the test. A suitably hydrated gel will form a hand sheet which shrinks upon drying to a diameter which is at least 35% smaller than its original diameter.

In a third method, the hand sheet is dried and a small flame applied to its underside. If the cellulose is sufficiently hydrated, this instantaneously will produce a blister in the sheet.

In a fourth test procedure 250 ml. of the refined pulp slurry is dried into a solid ball. If the gel is sufficiently hydrated for the present purposes, the ball will sink when dropped into water and thereafter will remain hard without swelling for an indefinite period of submergence.

To supplement the binding action of the hydrated cellulosic gel there may be included in the board products of the invention from 1–20% by weight, dry solids basis, of a starch type binder, the starch comprising either corn starch or tapioca starch. Tapioca starch is preferred. Because of its low gel point of 165° F., the tapioca starch when used uncooked does not slow drainage of the furnish on the wire.

The starch is incorporated into the furnish in the form of an uncooked, commercially available, dry powder. It develops its adhesive qualities as it is cooked upon passing the wet-formed mat through the kiln.

A usage of tapioca starch or corn starch in an amount of from 1 to 3% by weight has the advantage of providing a board of slightly increased hardness. A starch usage of greater than 3% has the advantage of reducing materially the drying rate of the board in the kiln. An appreciable proportion of the water content of the wet board is bound chemically by the starch as it cooks.

An acceptable composition board product may be made without the use of any binder other than the above noted hydrated cellulosic gel. However, if desired, still other classes of binders may be included in the furnish for various purposes. A typical one comprises a phenolic resin adhesive added in suitable proportion to increase the water resistance and strength of the product.

As noted above, the inclusion of a substantial proportion of expanded vermiculite particles in the board-making furnish materially increases the drain time of the furnish on the wire. To correct for this factor, and to speed up production, there accordingly preferably is added to the furnish from 1 to 20% by weight, dry solids basis, of defiberized lignocellulose, particularly defiberized wood.

Wood, of course, is a combustible material and its use in substantial amount is to be avoided in the manufacture of fire resistant composition boards of the class under consideration herein. However, if the wood is employed in the form of wood fiber having maximum freeness with respect to water drainage, it may be used in a minimum amount and thus achieve the desired purpose.

The wood fiber used for this purpose may be derived from such woods as the wood of the eucaluputs, alder or Douglas fir. It is prepared by defiberizing wood pieces in wood defiberizing apparatus such as an "Asplund" defibrator or a "Bauer No. 418" refiner operating at a steam pressure of about 150 pounds per square inch. In either case the wood is reduced to a U.S. Sieve series classification of, for example, 4% plus 12, 20% plus 20, and 76 minus 20 mesh. The fiber should have a freeness as measured by the TAPPI-CSF test method (TAPPI Standard 227m 46) of less than 750.

Supplemental fire resistant materials, binders, retention and dispersion aids, and materials incorporated to gain special color or appearance effects may be added to the board-making furnish as indicated. For example, from 1 to 5% by weight of rasorite may be included for the purpose of reducing board flame spread and smoke.

In the manufacture of the fire resistant vermiculite composition board of the invention, the partially heat expanded vermiculite is prepared as outlined above. The board-making furnish then is prepared by first placing the total amount of water predetermined to achieve a desired furnish consistency of 6 to 8% in a tank equipped with agitating means. Next the hydrated cellulosic gel is added, after which are added the starch binder, clay, and lignocellulosic fiber. The predetermined amount of vermiculite is added last, after the other constituents have been thoroughly mixed and dispersed in each other. This technique avoids breaking down of the vermiculite, which is susceptible to particle size reduction under the conditions of mixing.

The furnish thus prepared then is run immediately onto the forming wire of a Fourdrinier or other conventional board making apparatus equipped with pressure rolls for rolling the wet lap to the predetermined thickness.

The sheet is vacuum formed and roll pressed to a solids content of about 30% by weight, after which it is cut into sheets and transferred to a three zone kiln.

In the first zone of the kiln, temperatures of 600° to 700° F. are maintained in order to cook the starch content of the mat and develop its adhesive qualities. In the second and third zones, where much drying of the mat occurs, the temperatures are regulated at between 450° to 550°, and 400° to 500° F. respectively.

Drying is continued to a final board moisture content of less than 1%, preferably about 1/2% by weight. This is of importance since if a small excess of water is present, for example that represented by a board moisture content of 3% by weight, that moisture is concentrated in the center of the board as a "wet line". This means that the moisture content along the neutral axis of the board may be as high as 15 to 20%. In such a case, the boards discharged from the kiln are weak and may be damaged very easily in subsequent handling operations, such as when moving the sheets by hand, or subjecting them to the stripping action of a punch press such as is employed to punch small holes into the board surface in the manufacture of acoustical board.

As a result of the foregoing, there is produced a uniform board having a moisture content of less than 1%, a thickness of, for example, ⅜ inch, and a density of 15 to 20 pounds per cubic foot. After cooling, the board may be applied to its various structural uses as it is discharged from the kiln. However, I have discovered that its fire resistance properties may be improved materially by coating one or both of its face surfaces with a layer of sodium silicate having a thickness from 0.001 inch to 0.01 inch, preferably about 0.003 inch.

The sodium silicate coating is applied by forming an aqueous solution or suspension of sodium silicate, e.g. a suspension containing 20% sodium silicate solids in water, and applying the suspension to the board in conventional roll coaters, on one or both sides. The coated board then is dried very rapidly with infared radiant heat at temperatures of from 300° to 400° C.

The effect of the sodium silicate coating is two-fold:

In the first place, since the coating is intumescent, it lifts and separates from the body of the board when the board is subjected to fire. This forms an insulating layer which maintains the body of the board at a reduced temperature.

In the second place, the sodium silicate coating acts as a seal which prevents the escape of combustible gases from the body of the board. As is apparent, the board contains wood fibers, starch and other organic materials which upon exposure to fire are decomposed and form combustible gases. The escape of such gases from the board and their subsequent ignition spreads the fire. It is one of the factors which is measured by the standard fire resistance test which the board must pass.

However, when the board has a coating of sodium silicate over its face, the combustible gases generated by decomposition of the combustible content of the board are sealed in the board and prevented from escaping for an appreciable time. The fire resistance qualities of the board are correspondingly upgraded.

Still further, the presence of a sodium silicate coating covers up any exposed cellulosic or other organic materials which might be present on the board surface and further reduces any tendency of the board to ignite when exposed to fire. It also makes the back of the board impervious to the passage of hot gases. This materially increases the time required for the heat to penetrate the board to an excessive degree.

EXAMPLES

The invention is illustrated by the following examples, wherein parts are given in parts by weight.

EXAMPLE 1

This example illustrates the process for the preparation of a hydrated cellulosic gel suitable for use in the fire resistant composition board of the invention.

Bleached sulphite pulp in the form of dry sheets was added with water to a hydrapulper and hydrapulped to a stock consistency of about 7%. This required 30 minutes. The resulting pulp slurry was pumped to a storage tank from which it was fed in a controlled flow of about one ton per hour (dry basis) through a sequence of three primary refiners arranged in series and operating at atmospheric temperature and pressure. The refiners employed were Beloit-Jones ("Fibermaster II") refiners equipped with lava tackle.

The resulting partially refined and hydrated stock was transferred to a second storage tank from which it was fed in controlled flow to a secondary refiner. The refiner employed was a Beloit-Jones "Double D Series 4000" refiner equipped with 26 inch stainless steel discs and piped for monoflow operation. The discs of the refiner were arranged to provide two passes through the discs each time a partially refined and hydrated stock entered the refiner.

The stock was passed through the refiner at a flow rate of four tons of stock (dry basis) per hour. By virtue of its monoflow connection, the secondary refiner gave the stock a total of eight refining steps as compared with the three steps it was given in the three primary refiners arranged in series.

The stock was processed in the secondary refineries to a condition of exhaustive, or substantially complete hydration. When tested by TAPPI standard test No. 221-05-63 it had a drain time of approximately 1800 seconds.

EXAMPLE 2

This example illustrates the method for the manufacture of the fire resistant composition board of the invention, and its fire resistant qualities.

In a large reaction vessel equipped with a stirrer were added in the order named and with continuous agitation of the contents, water; 10 parts "taubate" ceramic type clay having a mesh size of −200 to −20 and a sintering temperature of 1200° F.; 20 parts hydrated cellulosic gel prepared as in Example 1; 3 parts tapioca starch having a mesh size of −20 mesh; and 10 parts of Asplund defibrated wood fiber having a freeness of 700 C.S.F., and defibrated to a fiber size of 4% + 20 mesh, 20% plus 20 mesh and 76% - 20 mesh.

After thorough mixing of the above constituents, there were added 56 parts vermiculite having a mesh size of from +200 to −6 and heat expanded to 90% of its capacity for heat expansion. All of the water was added in the first instance and sufficient was added to determine a final mix consistency of 6%.

The furnish thus prepared was run onto the vacuum forming wire of a Fourdrinier type vacuum forming machine equipped with press rolls. The wet lap discharged from the machine had a solids content of 30% by weight and a thickness of ⅝ inch. It was cut into sections and kiln dried in a three zone kiln at successive zone temperatures of 650° F., 500° F., and 450° F. The moisture content of the kiln dried board was ½% by weight.

Part of the board product thus prepared was painted on one or both surfaces; part was coated with a layer of sodium silicate on one or both surfaces; and part of the sodium silicate-coated board was painted on the sodium silicate surface.

The sodium coating was applied by preparing a 20% by weight solution of sodium silicate in water and applying the solution to one or both surfaces of the board with a roll coater. The application was sufficient to form a finished coat 0.002 inch thick. The board with the freshly applied coating was dried by subjecting it to infared radiant heat at 350° C.

The board samples thus prepared were subjected to A.S.T.M. test method No. E84-70 designed for testing the fire resistance of structural boards. The test measured (1) flame spread, (2) smoke developed and (3) fuel contributed to the fire by the board being tested. For a class A board rated "Incombustible" by the Underwriters Laboratories, the "flame spread" value must be less than 25. In addition, in order to have a board of satisfactory fire resistant properties, the "smoke developed" value should be less than about 30 and the "fuel contributed" value less than about 35.

The test was carried out by placing 20 inch × 4 foot boards endways along the length of a 25 foot tunnel-type furnace. The face side of the board was placed outwardly. A fire jet was established at one end of the tunnel. Flame spread was measured by measuring the rate of advancement of the flame front along the line of boards. Smoke density was determined by means of an elecric eye at the outfeed end of the furnace. Fuel contributed was calculated from the temperature of the gases discharged from the furnace. The results were as follows:

|  | Flame Spread | Smoke Developed | Fuel Contribute |
|---|---|---|---|
| Board #1 | 20 | —0— | 14.2 |

-continued

| | Flame Spread | Smoke Developed | Fuel Contribute |
|---|---|---|---|
| Board #2 | 15 | —0— | 12.3 |
| Board #3 | 15 | —0— | 14.5 |
| Board #4 | 15 | —0— | 10.7 |

Board No. 1 had a light coat of paint on the back side and three coats of paint on the face side, both coats comprising a conventional vinyl and clay type paint.

Board 2 was coated on both sides with a 0.002 inch thick layer of sodium silicate with the face side painted with a single coat of paint.

Board 3 was a plain uncoated vermiculite board containing 2% by weight, dry solids, basis, or rasorite.

Board 4 had a 0.002 inch thick coating of sodium silicate on both faces, but was unpainted.

From the foregoing it is apparent that all of the test boards attained on "incombustible" A rating.

EXAMPLE 3

This example illustrates the expansion upon heating characteristics of the hereindescribed fire resistant composition board.

For purposes of comparison two board samples were provided. The first, Board No. 1 was a vermiculite-containing composition board of the invention made as set forth in Example 2. The second, No. 2, was a commercial mineral fiber board. The respective compositions of the two test samples were as follows:

| | Board #1 (% by weight) | Board #2 (% by weight) |
|---|---|---|
| Heat expanded vermiculite particles - 90% expanded | 67 | — |
| Ceramic clay particles | 10 | 10 |
| Hydrated cellulosic gel | 10 | — |
| Starch binder | 3 | 12 |
| Defiberized wood | 10 | 10 |
| Mineral fiber | — | 68 |

Both of the above test samples were placed in a muffle furnace and heated at 900° C. for 30 minutes. Their dimensions were measured before and after heating with results as follows:

| | Board #1 | Board #2 |
|---|---|---|
| Board size before heating (cm.) | 7.91 × 7.77 × 1.65 | 7.91 × 7.77 × 1.66 |
| Board size after heating (cm.) | 8.07 × 8.09 × 1.77 | 7.41 × 7.25 × 1.43 |
| Shrinkage or expansion (%) | +2 +4 +7 | −6.32 −6.69 −13.85 |

It is apparent from the foregoing that the vermiculite-containing board of the invention expanded appreciably in all three dimensions during heating, while conversely the mineral fiber board shrank materially during heating in all three dimensions.

EXAMPLE 4

This example illustrates the beneficial effect on slurry drain time of incorporating wood fiber as a component of the furnishes employed in the manufacture of the hereindescribed vermiculite composition boards.

Three test sample board furnishes were prepared containing different amounts of wood fiber. In each case the fiber was derived by defiberizing eucalyptus wood in an Asplund defibrator at a steam pressure of 150 psi and corresponding temperature. The resulting fiber had a TAPPI freeness of 675 C.S.F. The compositions (% by weight) of the three test samples were as follows:

| | Furnish #1 | Furnish #2 | Furnish #3 |
|---|---|---|---|
| Vermiculite (90% expanded) | 77 | 67 | 57 |
| Ceramic clay | 10 | 10 | 10 |
| Wood fiber | 0 | 10 | 20 |
| Tapioca Starch | 3 | 3 | 3 |
| Cellulosic gel (Drain time: 1500 sec.) | 10 | 10 | 10 |

The drain time of each of the above furnishes was determined by draining water from an amount of the stock sufficient to make a ⅜ inch board at 20 pounds per cubic foot dry density. Gravity drainage time was measured by draining until all water had left the top of the formed sheet. Vacuum drainage time was measured by noting the time required to drain the sheet completely under an applied vacuum of 15 inches.

The results were as follows:

| | Furnish #1 | Furnish #2 | Furnish #3 |
|---|---|---|---|
| Gravity drain time (seconds) | 77 | 57 | 35 |
| Vacuum drain time (seconds | 21 | 20 | 18 |

Having thus described my invention in preferred embodiments, I claim:

1. Fire resistant vermiculite composition board comprising a felted, dried sheet comprising in dispersed admixture:

| | % by weight |
|---|---|
| Heat-expanded vermiculite particles | 40 to 90 |
| Ceramic clay particles | 5 to 20 |
| Hydrated cellulosic gel having a TAPPI drainage time of at least 900 seconds | 10 to 30. |

2. Fire resistant vermiculite composition board comprising a felted, dried sheet comprising in dispersed admixture

| | % by weight |
|---|---|
| Heat-expanded vermiculite particles | 40 to 90 |
| Ceramic clay particles | 5 to 20 |
| Hydrated cellulosic gel having a TAPPI drainage time of at least 900 seconds | 10 to 30 | the vermiculite being expanded to from 40–98% of its capacity for heat expansion and hence to a degree resulting in its further heat expansion, and accordingly heat expansion of the composition board of which it is a component, upon exposure of the board to fire.

3. The composition board of claim 2 wherein the vermiculite is expanded to from 75 to 98% of its capacity for heat expansion.

4. The composition board of claim 2 wherein the vermiculite content is from 50 to 70% by weight.

5. The composition board of claim 2 wherein the hydrated cellulosic gel is characterized by a TAPPI drainage time of from 900 to 1,800 seconds.

6. The compositon board of claim 2 including from 1 to 20% by weight of wood in fibrous form.

7. The composition board of claim 2 including from 1 to 20% by weight of defiberized wood fibers having a TAPPI freeness of less than 750 C.S.F.

8. The composition board of claim 2 including from 1 to 20% by weight starch.

9. The composition board of claim 2 including from 1 to 20% by weight defiberized wood and from 1 to 20% by weight starch.

10. The composition board of claim 2 wherein at least one outer face of the board is covered with a coating of sodium silicate.

11. The composition board of claim 2 wherein at least one outer face of the composition board is coated uniformly with a substantially impervious coating of sodium silicate, the coating having a thickness of from 0.001 inch to 0.01 inch.

12. The composition board of claim 2 wherein the board has a moisture content of less than 1% by weight.

13. Fire resistant vermiculite composition board comprising a felted, dried sheet containing in dispersed admixture:

|  | % By Weight |
|---|---|
| Heat-expanded vermiculite particles | 50 to 70 |
| Ceramic clay particles | 5 to 20 |
| Hydrated cellulosic gel, having a TAPPI drainage time of at least 900 seconds | 10 to 30 |
| Wood in fibrous form | 1 to 20 |
| Starch | 1 to 20 | the vermiculite being expanded to a degree of from 75 to 98% of its capacity for heat expansion, and at least one outer face of the board having substantially uniform, impervious coating of sodium silicate, the coating having a thickness of from 0.001 inch to 0.01 inch.

14. The process for the manufacture of fire resistant vermiculite composition board which comprises:

a. heating vermiculite to a temperature for a duration predetermined to partially expand the vermiculite to a degree of from 40 to 98% of its capacity for heat expansion, b. forming an aqueous slurry of board-forming consistency comprising:

|  | % by weight |
|---|---|
| The partially expanded vermiculite of step "a" | 40 to 90 |
| Ceramic clay particles | 5 to 20 |
| Hydrated cellulosic gel having a TAPPI drainage time of at least 900 seconds | 10 to 30 | c. vacuum forming the slurry into a wet sheet on a board-forming screen, and d. drying the sheet.

15. The process of claim 14 including the step of heating the vermiculite under conditions predetermined to expand it to from 75 to 98% of its capacity for heat expansion.

16. The process of claim 14 including the step of adding to the slurry from 1 to 20 parts by weight starch and thereafter kiln drying the wet sheet in three temperature zones, the first being maintained at from 600° to 700° C., the second at from 450° to 550° C., and the third at from 400° to 500° C.

17. The process of claim 14 including the step of adding to the slurry from 1 to 20 parts by weight defiberized wood and thereby accellerating the drainage of the slurry on the board-forming screen.

18. The process of claim 14 including the step of coating at least one face of the dried sheet with a coating of sodium silicate.

19. The process of claim 14 wherein the sheet is dried to a moisture content of less than 1% by weight.

* * * * *